United States Patent [19]

Ueno et al.

[11] Patent Number: 5,021,226
[45] Date of Patent: Jun. 4, 1991

[54] METHOD OF PRODUCING FIBROUS MAGNESIUM OXYSULFATE OF GRANULAR FORM

[76] Inventors: Kouhei Ueno; Tomohiko Akagawa, both of c/o Sakai Factory, Ube Industries, Ltd., 1, Chikkoshinmachi 3-chome, Sakai-shi, Osaka-fu; Kazuyoshi Obana, c/o Hirakata Laboratory, Ube Industries, Ltd., 3-10, Nakamiya, Kitamachi, Hirakata-shi, Osaka-fu, all of Japan

[21] Appl. No.: 371,556

[22] Filed: Jul. 10, 1989

Related U.S. Application Data

[62] Division of Ser. No. 333,273, Apr. 5, 1989, abandoned.

[30] Foreign Application Priority Data

Apr. 5, 1988 [JP] Japan .................................. 63-83702

[51] Int. Cl.$^5$ ........................... C01F 11/46; C01F 5/42
[52] U.S. Cl. .................................... 423/554; 428/400; 428/401
[58] Field of Search ....................... 428/397, 400, 401; 423/415 R, 554

[56] References Cited

FOREIGN PATENT DOCUMENTS 57-109846 7/1982 Japan .
59-172533 9/1984 Japan .
61-072038 4/1986 Japan .
62-091547 4/1987 Japan .
63-142049 6/1988 Japan .

OTHER PUBLICATIONS

Reed, James Stafford, Ceramics, 1988, pp. 313–314.

Primary Examiner—Joseph L. Schofer
Assistant Examiner—Mark Sweet
Attorney, Agent, or Firm—Parkhurst, Wendel & Rossi

[57] ABSTRACT

A fibrous magnesium oxysulfate of granular form according to the present invention has an apparent specific gravity of 0.13–0.25, an oil absorption of 260–600 ml/100 g, a fiber diameter of 0.1–2.0 μm and a fiber length of 10–100 μm. The thermoplastic resin composition obtained by incorporating the magnesium oxysulfate into a thermoplastic resin has good properties and good appearance.

1 Claim, No Drawings 5,021,226

METHOD OF PRODUCING FIBROUS MAGNESIUM OXYSULFATE OF GRANULAR FORM

This is a continuation of division of Ser. No. 333,273, filed Apr. 5, 1989, now abandoned.

BACKGROUND

1. Field of the Invention

The present invention relates to fibrous magnesium oxysulfate of granular form and a process for producing the magnesium oxysulfate, as well as to a thermoplastic resin composition containing magnesium oxysulfate.

It is a well known technique to add an inorganic substance to a polypropylene resin in order to improve the latter's properties such as rigidity, mechanical strengths, heat resistance, mold shrinkage factor, dimensional stability and the like. As such an inorganic substance, particulate substances (e.g. calcium carbonate, barium sulfate, magnesium hydroxide), small plate-shaped or flaky substances (e.g. talc, mica) and fibrous substances (e.g. glass fiber, asbestos) are well known.

The particulate substances show no sufficient reinforcing effect for polypropylene resins. Therefore, the polypropylene resin compositions obtained by adding such a particulate substance to a polypropylene resin cannot be used ordinarily in applications where a high performance is required. Meanwhile, the small plate-shaped or flaky substances and the fibrous substances show an excellent two or one-dimensional reinforcing effect for polypropylene resins and accordingly are in wide use as a reinforcing material for polypropylene resins. These materials showing a high reinforcing effect, however, have drawbacks in other respects, thus restricting their use as a reinforcing material depending upon their applications. For example, the polypropylene resins containing a small plate-shaped or flaky substance, as compared with those containing a fibrous substance (e.g. glass fiber), generally has low rigidity when made into a molded article and easily give rise to flow marks during molding. The polypropylene resins containing a fibrous substance, when made into a molded article, show small elongation, easily cause silver streaking, and give poor luster. The polypropylene resin containing a glass fiber, in particular, shows low impact resistance at high temperatures when made into a molded article. Hence, in adding these conventional reinforcing materials to polypropylene resins, the selection of a reinforcing material must be made in consideration of not only the application of the molded article obtained from the resulting polypropylene resin composition but also the drawback of the reinforcing material.

The above mentioned drawbacks of the conventional reinforcing materials can be partly reduced by, for example, the selection and modification of a polypropylene resin used as a base material, the surface treatment of an inorganic substance used as a reinforcing material, the addition of an appropriate third substance and the modification of molding conditions. However, these measures cannot sufficiently reduce the above drawbacks of the conventional reinforcing materials.

Japanese Patent Application Kokai (Laid-Open) No. 57-109846 discloses that the use of fibrous magnesium oxysulfate as an inorganic substance can reduce the above drawbacks.

However, since the fibrous magnesium oxysulfate has a very small bulk specific gravity, its mixing with a pellet-like or granular resin is not easy (a polypropylene resin of pellet or granular form is generally used in ordinary compounding). That is, since the fibrous magnesium oxysulfate and the polypropylene resin have different shapes and densities, they are, as in the ordinary mixing of an inorganic substance and a polypropylene resin, premixed in a dry blender such as V-shaped blender, ribbon mixer or the like and then fed to a melt mixer (this is a dry blending method); in this case, there easily occurs, at the inlet of the melt mixer, bridging or the separation of the polypropylene resin and the fibrous magnesium oxysulfate. This reduces the productivity of a desired reinforced resin composition and makes it difficult to obtain a uniform resin composition; as a result, the molded articles produced therefrom have poor properties and poor appearance in some cases.

Japanese Patent Application Kokai (Laid-Open) No. 59-172533 discloses a process for producing a reinforced resin composition free from the above mentioned drawbacks, by mixing a thermoplastic resin and fibrous magnesium oxysulfate.

This process comprises feeding into a melt kneader a pellet-like or granular thermoplastic resin and fibrous magnesium oxysulfate separately through respective inlets and then melt-kneading them in the kneader.

Also in this process, however, since the fibrous magnesium oxysulfate has a very small bulk specific gravity, the uniform feeding of the magnesium oxysulfate into the kneader is difficult; as a result, it is difficult to obtain a resin composition of good properties and good appearance.

OBJECTS AND SUMMARY OF THE INVENTION

The objects of the present invention are to obtain fibrous magnesium oxysulfate which can be mixed with a thermoplastic resin such as polypropylene resin and polyoxymethylene easily and uniformly to provide a thermoplastic resin composition of good properties and good appearance, as well as to obtain a uniform reinforced thermoplastic resin composition containing said fibrous magnesium oxysulfate.

The present invention conducted studies in order to achieve the above objects. As a result, it was found that fibrous magnesium oxysulfate of granular form having an apparent specific gravity of 0.13–0.25 can be obtained by synthesizing fibrous magnesium oxysulfate by, for example, a hydrothermal reaction, freeing the synthesis product of the portion of 250 $\mu$m or more and subjecting the resulting product to pelletization under particular conditions and further that the mixing of the fibrous magnesium oxysulfate of granular form and a thermoplastic resin at particular proportions causes no bridging at the inlet of a kneader and consequently can produce a uniform thermoplastic resin composition having good properties and good appearance. The above finding has led to the completion of the present invention.

The present invention provides, as the first invention, fibrous magnesium oxysulfate of granular form having an apparent specific gravity of 0.13–0.25, an oil absorption of 250–600 ml/100 g, a fiber diameter of 0.1–2.0 $\mu$m and a fiber length of 10–100 $\mu$m, which is obtained by freeing fibrous magnesium oxysulfate of the portion of 250 μm or more and then converting the resulting product into a granular form; as the second invention, a process for producing fibrous magnesium oxysulfate of granular form, which comprises synthesizing fibrous magnesium oxysulfate, freeing the synthesis product of the portion of 250 μm or more followed by dehydration, and subjecting the dehydrated product to pelletization and drying; and as the third invention, a thermoplastic resin composition comprising 60–97% by weight of a thermoplastic resin and 3–40 % by weight of fibrous magnesium oxysulfate of granular form having an apparent specific gravity of 0.13–0.25, an oil absorption of 250–600 ml/100 g, a fiber diameter of 0.1–2.0 μm and a fiber length of 10–100 μm.

DETAILED DESCRIPTION OF THE INVENTION

First, the process for producing the fibrous magnesium oxysulfate of granular form (hereinafter referred to as the component A) of the present invention is described.

The fibrous magnesium oxysulfate used in the present invention as a starting material for the component A is represented by the following rational formula.

MgSO$_4$.5MgO.8H$_2$O

According to the present invention, this fibrous magnesium oxysulfate can be produced by the following process.

First, magnesium hydroxide or magnesium oxide is dispersed in an aqueous magnesium sulfate solution.

Use of too large an amount of magnesium hydroxide or magnesium oxide fails to produce a desired fibrous product. Therefore, it is preferable that magnesium hydroxide or magnesium oxide be dispersed in a concentration of 25% by weight or less, preferably 0.1–20% by weight.

As is clear from the above rational formula, 0.2 mol of magnesium sulfate is theoretically required per 1 mol of magnesium hydroxide or magnesium oxide. However, industrially it is preferable to use magnesium sulfate in a larger-than-stoichiometric amount because the use of magnesium hydroxide or magnesium oxide in a large-than-stoichiometric amount gives a reaction mixture in which an objective product and unreacted magnesium hydroxide or magnesium oxide coexist in a solid form, making difficult the separation of the objective product from the reaction mixture. Therefore, the use of more than 0.2 mol of magnesium sulfate per 1 mol of magnesium hydroxide or magnesium oxide makes it possible to separate the objective product from the reaction mixture by a simple procedure such as filtration, decantation or the like.

It is sufficient that the reaction system contain magnesium sulfate and magnesium hydroxide or magnesium oxide. Accordingly, sulfuric acid may be used in place of magnesium sulfate.

The slurry dispersion of magnesium hydroxide or magnesium oxide in an aqueous magnesium sulfate solution is then subjected to a hydrothermal reaction. The hydrothermal reaction is caused in water under a temperature higher than 100° C. and a high pressure.

The hydrothermal reaction temperature is 100–350° C., preferably 120–250° C. because the temperatures lower than 100° C. give no fibrous product and the temperatures higher than 350° C. allow the product to cause dehydration. Since the hydrothermal reaction is a solid-liquid reaction, it is preferably effected with stirring so as to ensure sufficient solid-liquid contact. The reaction time varies depending upon the reaction conditions but is appropriately 0.1–30 hours in usual cases.

The thus synthesized fibrous magnesium oxysulfate has a cotton form. Hitherto, this has been used in a blend with a resin, after drying. In the present invention, however, the above fibrous magnesium oxysulfate of cotton form is further subjected to the following post-treatment to obtain fibrous magnesium oxysulfate of granular form.

That is, the fibrous magnesium oxysulfate of cotton form synthesized above is freed of the fluffy ball-like portion of 250 μm or more by a vibratory screen and the resulting product is then dehydrated to a water content of 65–80% by weight, preferably 70–75% by weight. This dehydration operation is very important in the present invention. When the dehydration is not made to the above water content range, the subsequent pelletization operation does not proceed as desired and no granule can be produced. That is, when the dehydration is made to a water content of less than 65%, the fiber-to-fiber adhesion by water is insufficient and no granule can be produced. When the dehydration is made to a water content of more than 80%, once formed granules adhere to each other owing to the high water content. The dehydration is effected a centrifugal dehydrator ordinarily. The measurement of the water content was made according to the following procedure.

A dehydrated cake of 10 g is put into a measuring bottle and the bottle is weighed. The bottle is heated at 160° C., 30 minutes to the water content and cooled down to room temperature in a desiccator. The bottle is then weighed and the water content is calculated according to the following formula:

Water Content (%) = 100 −  $\times$ 100

$$\frac{\text{Weight of the bottle after drying}}{\text{Weight of the bottle before drying}}$$

The above obtained dehydrated cake is pelletized to a granular form of 1–5 mm in diameter and 1–20 mm in length, preferably 2–4 mm in diameter and 2–7 mm in length, using a pelletizer, and then dried to a water content of 1% or less using a dryer to obtain fibrous magnesium oxysulfate of granular form.

In the present invention, "granular form" refers to a columnar or cuboidal form obtained by pelletization of fibrous magnesium oxysulfate and having an average apparent diameter of about 2–4 mm and a length of 2–5 mm.

The above obtained fibrous magnesium oxysulfate of granular form (the component A) has an apparent specific gravity of 0.13–0.25, an oil absorption of 250–600 ml/100 g, a fiber diameter of 0.1–2.0 μm and a fiber length of 10–100 μm.

The component A, as compared with the conventional fibrous magnesium oxysulfate having an apparent specific gravity of 0.01–0.1 and an oil absorption of 10–200 ml/100 g, has a high apparent specific gravity and a large oil absorption and moreover is granular. Therefore, the component A causes no bridging in kneading with a thermoplastic such as polypropylene and the resulting composition gives substantially the same formulation at the early and final stages of kneading. In addition, the composition has good balance in rigidity and impact resistance, as well as good appearance. The component A is contained in a thermoplastic resin composition in an amount of 3–40% by weight, preferably 4–25% by weight. When the content is less than 3% by weight, the composition has insufficient rigidity. When the content is more than 40% by weight, the composition has insufficient impact resistance.

The thermoplastic resin used in the present invention is a polypropylene resin or a polyoxymethylene resin. The polypropylene resin used in the invention is a homopolymer or a copolymer of propylene, preferably a crystalline ethylene-propylene block copolymer having an ethylene content less than 20% by weight and a melt flow index of 1–100 g/10 min., preferably 3–50 g/10 min.

The polyoxymethylene resin used in the invention includes an oxymethylene homopolymer and an oxymethylene copolymer. Methods for preparing the oxymethylene resin is well-known to a person skilled in the art. For example, the oxymethylene homopolymer may be prepared by polymerizing formaldehyde or trioxan in the presence of a catalyst such as an amine compound and a boron fluoride, and the oxymethylene copolymer may be produced by copolymerizing formaldehyde or trioxan with cyclic ether such as ethyleneoxide, 1,3-dioxolan and 1,3,6-trioxocane in the presence of Lewis acid.

As described above, there are provided, according to the present invention, fibrous magnesium oxysulfate of granular form having the above mentioned particular properties, a process for producing the magnesium oxysulfate, and a polypropylene resin composition of good properties and good appearance obtained by compounding the magnesium oxysulfate into a polypropylene resin.

EXAMPLES

The present invention is described in more detail below by way of Examples. However, the present invention is in no way restricted to the Examples.

In the Examples, each test item was measured according to the following test method.
Density
Measured according to ASTM D 1505.
Flexural modulus
Measured according to ASTM D 2853.
Izod impact strength
Measured according to ASTM D 256.
Appearance of molded article The surface of a test piece was observed visually.
O: Good appearance—the surface has luster and is free from flow marks.
Δ: Slightly poor appearance—the surface has no luster and the surface condition is non-uniform.
X: Poor appearance—the surface contains foreign matter-like substances.

EXAMPLE 1

Manufacturing fibrous magnesium oxysulfate of granular form

Magnesium sulfate hepta hydrate of 4.2 kg and magnesium hydroxide of 2.0 kg were dispersed in 100 l water and agitated at 160° C., 3 hours in a pressure vessel reaction.

After completion of the reaction, the reaction product was filtrated, water-washed, its greater-than-250 μm fluffy ball-like matters removed by a vibration sieve, and dehydrated to 70% water content by a centrifugal dehydrator.

The dehydrated cake was granulated to granules with 2.0mm in diameter and 3.0 mm in length by using a pelletizer and dried at 200° C. for 30 hours by a dryer to obtain fibrous magnesium oxysulfate of granular form.

The fibrous magnesium oxysulfate of granular form obtained had an apparent specific gravity of 0.18, an oil absorption of 530 ml/100 g, a mean fiber diameter of 0.3 μm, and a mean fiber length of 50 μm.

EXAMPLES 2

There were dry-blended 10% by weight of fibrous magnesium oxysulfate of granular form obtained in the above Example 1, 90% by weight of a crystalline ethylene-propylene block copolymer having a melt flow index of 9 g/10 min, and 0.2 PHR (parts per hundred resin) of 2,6-di-tert-butyl-p-cresol (BHT)(Yoshinox, a product of Yoshitomi Pharmaceutical Industries, Ltd.) for a heat stabilizer, to obtain 50 kg of a blend. The total amount of the blend was fed into a hopper of a high speed double-shaft extruder.

The extrusion rate of the extruder was controlled at 50 kg/hr and the kneaded product was divided into three portions, i.e. the first 20-min portion, the intermediate 20-min portion and the last 20-min portion. The properties of each portion were measured and are shown in Table 1.

COMPARATIVE EXAMPLE 1

The same procedure as in Example 1 was repeated except that the fibrous magnesium oxysulfate of granular form used in Example 1 was replaced by conventional fibrous magnesium oxysulfate of cotton form having an apparent specific gravity of 0.08, an oil absorption of 156 ml/100 g, an average fiber diameter of 0.3 μm and an average fiber length of 50 μm.

TABLE 1

|  | Example 2 | | | Comparative Example 1 | | |
| --- | --- | --- | --- | --- | --- | --- |
|  | First 20-min Portion | Intermediate 20-min Portion | Last 20-min Portion | First 20-min Portion | Intermediate 20-min Portion | Last 20-min Portion |
| Density (g/cm$^3$) | 0.970 | 0.969 | 0.971 | 0.962 | 0.957 | 0.979 |
| Flexural modulus (kg/cm$^2$) | 24,300 | 24,500 | 25,000 | 23,200 | 21,000 | 24,900 |
| Izod impact strength at 23° C. (kg · cm/cm) | 7.5 | 7.7 | 7.6 | 6.9 | 7.5 | 5.6 |
| Appearance of molded article | O | O | O | Δ | Δ | X |

As is clear from Table 1, in Example 2, the three portions gave uniform properties and good appearance while in comparative Example 1, the densities and other properties of the three portions were non-uniform and the appearances were poor.

EXAMPLE 3 AND COMPARATIVE EXAMPLES 2-3

The same procedure as in Example 1 was repeated except that each compounding was effected as shown in Table 2.

The properties and appearances of respective three portions are shown in Table 3.

As is clear from Table 3, Example 2 gave a uniform composition; Comparative Example 2 gave a non-uniform composition of poor balance in properties and poor appearance; Comparative Example 3 gave a composition of poor impact resistance and poor appearance.

TABLE 2

|  | Example 3 | Comparative Example 2 | Comparative Example 3 |
|---|---|---|---|
| Fibrous magnesium oxysulfate of granular form (wt. %) | 20 | — | 45 |
| Fibrous magnesium oxysulfate of cotton form (wt. %) | — | 20 | — |
| Crystalline ethylene-Propylene copolymer (wt. %) | 80 | 80 | 55 |

TABLE 3

|  | Example 3 | | | Example 4 | | | Comparative Example 2 | | | Comparative Example 3 | | |
|---|---|---|---|---|---|---|---|---|---|---|---|---|
|  | First 20-min Portion | Intermediate 20-min Portion | Last 20-min Portion | First 20-min Portion | Intermediate 20-min Portion | Last 20-min Portion | First 20-min Portion | Intermediate 20-min Portion | Last 20-min Portion | First 20-min Portion | Intermediate 20-min Portion | Last 20-min Portion |
| Density (g/cm$^3$) | 1.025 | 1.024 | 1.025 | 1.633 | 1.631 | 1.635 | 1.012 | 1.005 | 1.032 | 1.192 | 1.189 | 1.200 |
| Flexural modulus (kg/cm$^2$) | 36,200 | 36,000 | 36,300 | 100,100 | 100,000 | 101,000 | 33,000 | 32,500 | 36,800 | 58,000 | 57,300 | 59,100 |
| Izod impact strength at 23° C. (kg·cm/cm) | 5.6 | 5.6 | 5.4 | 3.2 | 3.3 | 3.1 | 4.5 | 4.9 | 3.8 | 3.1 | 3.3 | 2.9 |
| Appearance of molded article | O | O | O | O | O | O | × | × | × | × | × | × |

EXAMPLE 4

Example 2 was repeated except that the oxymethylene copolymer of formaldehyde and 1,3,6-trioxocane having an intrinsic viscosity of 1.47 dl/g and 6.0% by weight of 1,3,6-trioxocane unit in place of a crystalline ethylenepropylene block copolymer.

The results are shown in Table 3.

What is claimed is:

1. A method of producing fibrous magnesium oxysulfate of granular form, sequentially comprising the steps of:
   synthesizing fibrous magnesium oxysulfate using a hydrothermal reaction of an aqueous solution containing magnesium sulfate and magnesium hydroxide or magnesium oxide;
   removing ball-like portions of 250μm or more from said fibrous magnesium oxysulfate;
   dehydrating said fibrous magnesium oxysulfate to a water content of 65–80% by weight;
   pelletizing the dehydrated fibrous magnesium oxysulfate; and drying the pelletized fibrous magnesium oxysulfate.

* * * * *